United States Patent [19]
Brown

[11] Patent Number: 4,753,541
[45] Date of Patent: Jun. 28, 1988

[54] SEALED THRUST BEARING

[75] Inventor: Donald D. Brown, Thiensville, Wis.

[73] Assignee: Hayes Industrial Brake, Inc., Mequon, Wis.

[21] Appl. No.: 70,370

[22] Filed: Jul. 7, 1987

[51] Int. Cl.$^4$ ............................................. F16C 19/10
[52] U.S. Cl. .................................................. 384/607
[58] Field of Search ............... 384/607, 482, 909, 908, 384/492, 611, 617

[56] References Cited

U.S. PATENT DOCUMENTS

| | | | |
|---|---|---|---|
| 3,361,503 | 1/1968 | Greby | 384/607 |
| 4,204,720 | 5/1980 | Otani | 384/607 |
| 4,313,644 | 2/1982 | Dagiel | 384/607 |
| 4,530,609 | 7/1985 | Jasperse et al. | 384/482 |

Primary Examiner—Lenard A. Footland
Attorney, Agent, or Firm—Ronald E. Barry

[57] ABSTRACT

A sealed thrust bearing including a housing having a circular base, an outer cylindrical wall formed around the outer edge of the base, and a cylindrical hub at the center of the base spaced from and coaxial with the cylindrical wall, a thrust bearing positioned in the space between the wall and hub, the thrust bearing including an inner race centered on said hub, a set of ball bearings seated on the inner race, and an outer race centered on the hub and seated on the ball bearings, the outer wall including a collar formed around the outer edge of the wall and a V-shaped ridge on the inside of the outer edge of the collar located in a position to sealingly engage the outer edge of the outer race and an outwardly angled lip around the inside of the hub positioned to sealingly engage the inner edge of the outer race to thereby seal the bearing lubricant within the housing.

13 Claims, 2 Drawing Sheets

SEALED THRUST BEARING

BACKGROUND OF THE INVENTION

Thrust bearings are commonly used in mechanical applications where an axial force is required to impart the rotary motion from one member to another. The thrust bearing must be capable of imparting this high axial force at high rotary speeds with little or no wear on the operating parts. In order to provide a long life to the bearing, it must be lubricated periodically. Efforts to seal the bearing so that it is self-lubricating have not been satisfactory due to the inability to maintain the seal. This requires a sealed housing in order to retain the oil lubricant in the thrust bearing.

SUMMARY OF THE INVENTION

The thrust bearing, according to the present invention, is sealed during manufacture with the lubricant, oil or grease, in the housing. The housing is formed from a material which is unusually hard and has high compression characteristics and a low friction characteristic. Once the bearing is sealed, the bearing will last as long as the adjacent parts and is virtually maintenance free.

One of the principle features of the invention is the provision of a housing which has sufficient resilience to form a seal with the surfaces of a thrust bearing.

Another principle feature of the invention is the provision of a housing in which the bearing is permanently mounted.

Other principal features and advantages of the invention will become apparent to those skilled in the art upon review of the following detailed description, claims and drawings.

Figure 1:
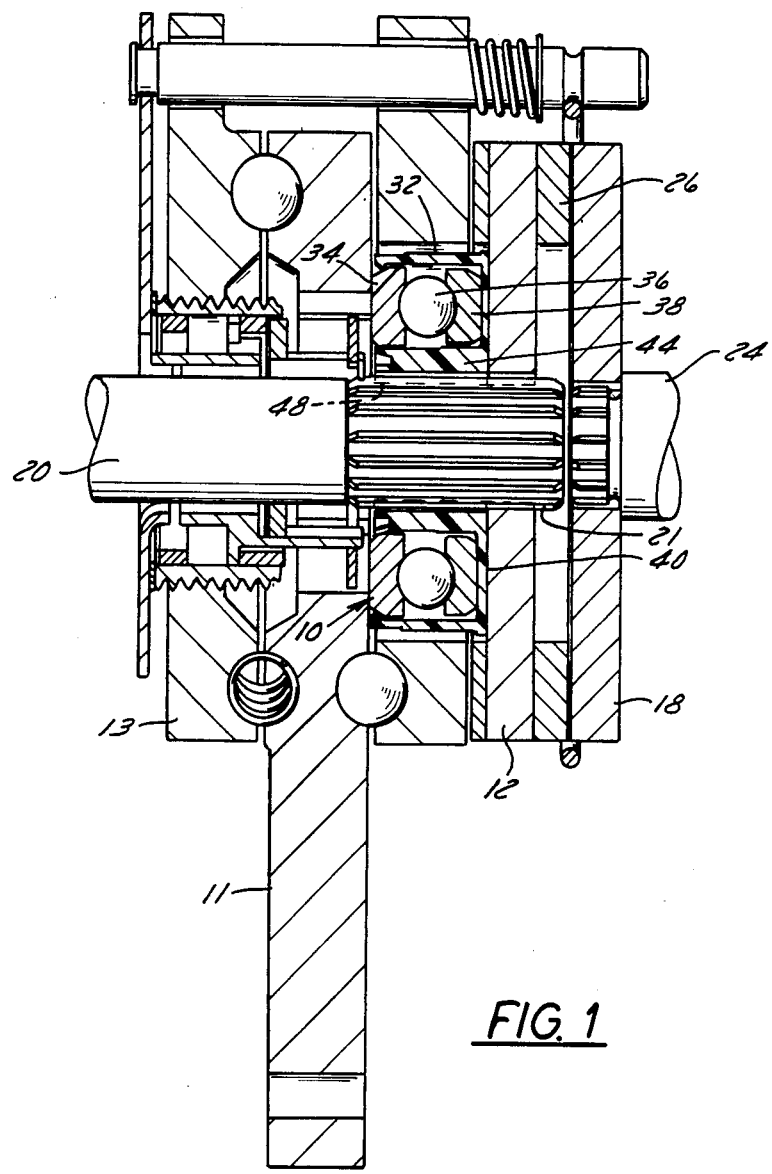
FIG. 1 is a section view of the sealed bearing shown mounted on a splined shaft in a limited slip differential.

Before an embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

In FIG. 1, the oil-sealed thrust bearing 10 according to the invention is shown in a limited slip type differential mounted on the splined end 21 of a shaft 20. The bearing 10 is mounted for axial movement on the spline into engagement with a friction disc 12. In this type of an application, a cam activated plate 11 is rotated with respect to the shaft 20 and is cammed by a ball type camming assembly to move axially into engagement with the sealed bearing 10. The sealed bearing 10 moves the friction disc 12 axially, with respect to the shaft 20 into engagement with a drive disc clutch plate 18 mounted on the spline on shaft 24. The sealed thrust bearing 10 allows the brake plate to rotate with the shaft 20 while the reaction plate 13 is held in a fixed position relative to the shaft 20. The friction pads 26 on plate 12 will engage the clutch plate 18 to transfer the rotary motion of the shaft 20 to the shaft 24.

Figure 2:
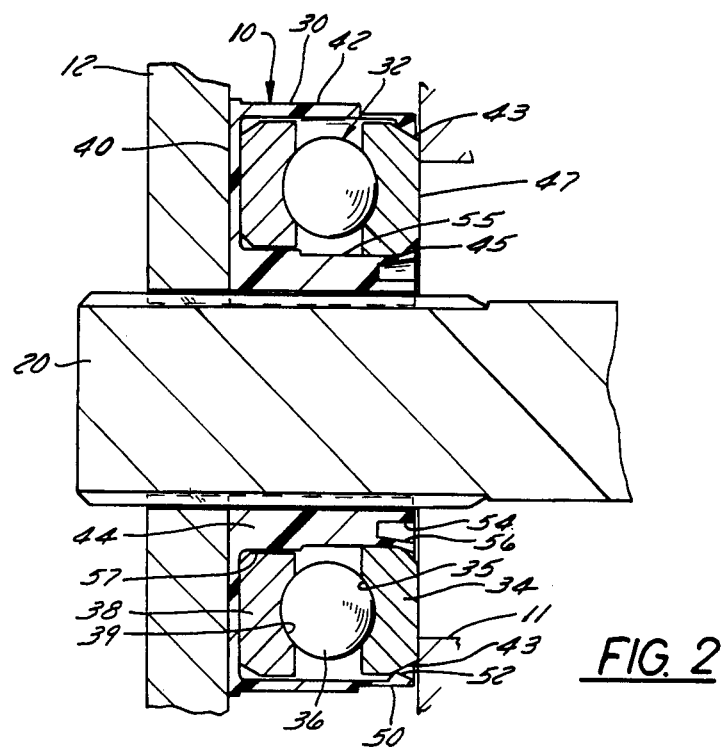
FIG. 2 is section view reverse oriented of the sealed bearing shown in FIG. 1.
Figure 3:
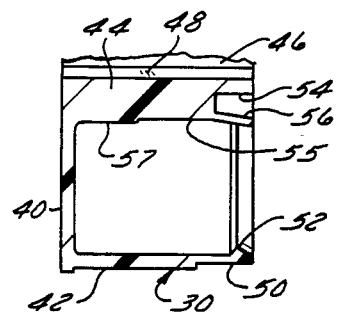
FIG. 3 is section view of a portion of the housing.
Figure 4:
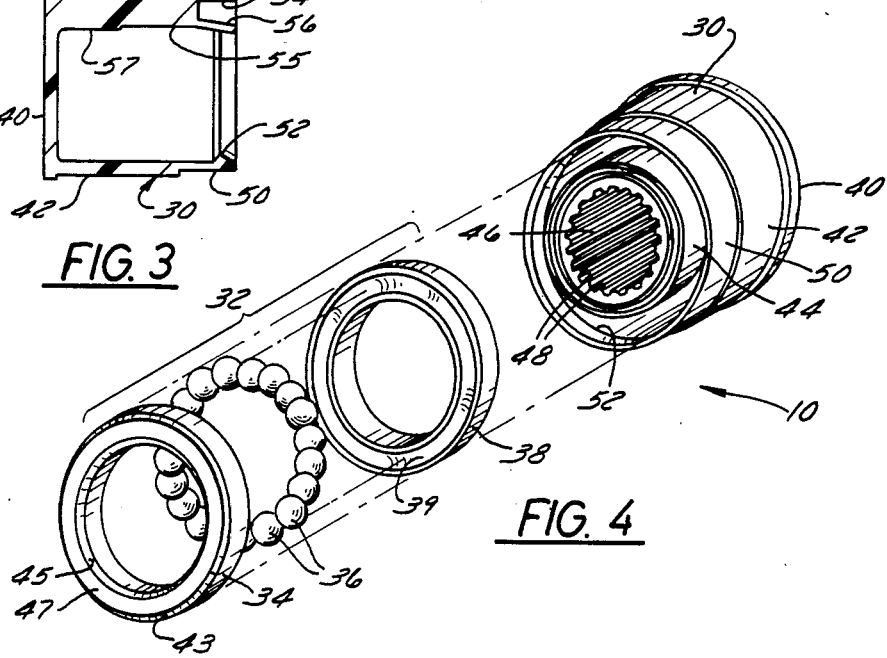
FIG. 4 is an exploded perspective view of the housing, and thrust bearing.

As seen in FIGS. 2 and 4, the thrust bearing 10 includes a housing 30 and a ball-type thrust bearing assembly 32 positioned in the housing 30. The housing 30 includes a flat base 40, an outer cylindrical wall 42 and an inner tubular hub 44 which has an axial opening 46 having spline grooves 48 provided around the bore 46. The spline grooves 48 corresponding to the splined end 21 of the shaft 20 so that the housing will rotate with the splined shaft.

The bearing assembly 32 includes an inner race 38, an outer race 34 and a set of ball bearings 36. The inner race 38 is seated on the base 40 between the wall 42 and the inner tubular hub 44. The outer race 34 is seated on the ball bearings 36.

The axial motion of the thrust bearings will be transferred through the balls 36 to the inner race 38 which is seated on the inner surface of the base 40 of the housing 30. The housing 30 rotates with the shaft 20 so that the only force exerted by the housing against the clutch pad holder 12 will be the axial force imparted to the inner race 36.

In accordance with the invention, the housing 30 as shown in FIG. 2 is formed from a material that has a low friction characteristic and a high compression characteristic. One material that meets these requirements is a Delrin actel-resin filled with Teflon fibers. This combination of materials has one of the lowest coefficients of friction of all grades of Delrin materials. A collar 50 is formed as an integral part of the cylindrical wall 42 and extends axially outwardly a short distance from the wall 42. Means are provided around the interior of the open end of the collar 50 to sealingly engage the chamfered edge 43 of the outer race 34. Such means is in the form of an internal V-shaped ridge 52. It should be noted that the thickness of the collar 50 with respect to the wall 42 is approximately one-half of the wall thickness to allow a certain amount of flexibility as described hereinafter. The rib 52 tapers inwardly to form a "V" which is located in a position to sealingly engage the outer chamfered edge 43 of race 34.

Means are also provided on the outer end of the hub 44 to sealingly engage the inner chamfered edge 15 of the outer race 34. Such means is in the form of a ring 56 which is formed by providing a groove 54 in the end of hub 44. It should be noted that the ring 56 is slanted outwardly slightly and is sufficiently flexible to be squeezed through the center of the inner race 38 and outer race 34. Both the ridge 52 and the ring 56 terminate short of the face 47 of the race 34.

Means are provided on the hub 44 to positively locate the inner race 38 and the outer race 34 in the housing 30. Such inner race means is in the form of an enlarged diameter section or land 57 provided on the outer surface of hub 44. The section 57 has a diameter substantially equal to the inner diameter of race 38. Such outer race means is the form of the outer section 55 of the hub 44 which has a diameter substantially equal to the inner diameter of the outer race 34.

The bearing assembly 32 is mounted in the housing 30 by locating the inner race 38 in the housing 30 with the inside diameter of the inner race 38 aligned with the increased diameter section or land 57 located within the housing 30. The balls 36 are placed in the groove 39 in the inner race 38. A lubricant is placed in the housing 30 and the outer race 34 is pushed onto the section 55 of the hub 44 into the space between the ridge 52 and the flexible ring 56 until the groove 35 in the outer race 34 is seated on the balls 36. The ridge 52 and the ring 56 have sufficient flexibility to form a seal around the outer edge 43 and inner edge 45 of the outer race 34.

The outer race 34 is sealed within the housing by means of the engagement of ridge 52 with the chamfered edge 43 and the ring 56 with the chamfered edge 45 of race 34. The ridge 52 and ring 56 in effect camming the outer race 34 against the balls 36 so that the race 34 is sealed in the housing 30.

Various other features and advantages of the invention are set forth in the following claims.

The embodiments of the invention in which an exclusive property or privilege is claimed, are defined as follows:

1. A sealed thrust bearing comprising a housing having a base,
a cylindrical outer wall and a hollow tubular hub having an axial bore,
a ball bearing assembly seated against the base between the hub and the cylindrical wall,
means on said hub for sealingly engaging the outer edge of the inside diameter of the bearing assembly and means on the inside of said cylindrical wall for sealingly engaging the outer edge of the outside diameter of said bearing assembly whereby said bearing assembly will be sealed in the housing.

2. The thrust bearing according to claim 1 wherein said sealing means on said hub comprises a flexible member formed integral with said hub and having a diameter greater than the inner diameter of the bearing assembly and said sealing means on said wall having a diameter smaller than the outside diameter of said bearing assembly.

3. The thrust bearing assembly according to claim 1 wherein said bearing assembly includes an inner bearing race and an outer bearing race, said hub including a first bearing surface for aligning said inner race in said housing and a second bearing surface for aligning said outer bearing race in said housing.

4. A sealed thrust bearing according to claims 1, 2 or 3 wherein said housing is formed of a low coefficient of friction material.

5. A sealed thrust bearing comprising
a housing having a cylindrical outside wall and a cylindrical hub having an axial bore,
an inner bearing race mounted on said hub,
a set of ball bearings supported on said inner race,
an outer race mounted on said hub and seated on said ball bearings for rotation with respect to said housing,
means on said outside wall for sealingly engaging the outer edge of said outer race,
and means on said hub for sealingly engaging the inside edge of said outer bearing race whereby a bearing lubricant will be sealed in said housing.

6. The bearing according to claim 5 wherein said sealing means on said outside wall comprises a cylindrical extension on said outside wall having a thickness less than the thickness of said cylindrical wall and a rib around the inside edge of said extension having a diameter less than the outside diameter of said outer case whereby said rib will sealingly engage said outer race in said housing.

7. The bearing according to claim 5 or 6, including an outwardly angled lip around the upper edge of said hub having an outer diameter greater than the inner diameter of said outer race whereby said lip will sealingly engage said outer race.

8. The bearing according to claim 5 or 6 including means on said hub for centering said inner race in said housing.

9. The bearing according to claim 5 or 6 wherein said housing is formed from a composition including an actel resin filled with teflon fibers.

10. A sealed thrust bearing comprising
a housing formed as an integral unit of a low coefficient of friction material,
said housing including a cylindrical outer wall having a collar of reduced thickness mounted on the end thereof, said collar including a "V" shaped inner ridge around the outer edge of said collar,
and a hub formed within said cylindrical outer wall and being coaxial with said outer wall, said hub including a ring tapering outwardly around the top of said hub
an inner bearing race mounted in said housing around said hub,
a set of ball bearings seated in said inner race and
an outer bearing race seated on said balls and sealed therein by said ridge on said collar and said ring on said hub.

11. The bearing according to claim 10 wherein said housing is formed from a Delrin actel resin filled with Teflon fibers.

12. The bearing according to claim 10 or 11 wherein said hub includes a first means for centering said inner race and said outer race in said housing.

13. The bearing according to claim 12 wherein said first means comprises an annular land formed around the base of said hub and having an outer diameter corresponding to the inner diameter of said inner race.

* * * * *